(12) United States Patent
Okano (10) Patent No.: US 7,006,839 B2
(45) Date of Patent: Feb. 28, 2006

(54) LETTER MESSAGE COMMUNICATION METHOD AND APPARATUS

(75) Inventor: Yoichi Okano, Tokyo (JP)

(73) Assignee: NEC Corporation, (JP)

( * ) Notice: Subject to any disclaimer, the term of this patent is extended or adjusted under 35 U.S.C. 154(b) by 650 days.

(21) Appl. No.: 09/860,580

(22) Filed: May 18, 2001

(65) Prior Publication Data

US 2001/0046871 A1    Nov. 29, 2001

(30) Foreign Application Priority Data

May 25, 2000    (JP) .............................. 2000/154719

(51) Int. Cl.
*H04Q 7/20*    (2006.01)

(52) U.S. Cl. ................... 455/466; 455/414.1; 455/567; 455/566

(58) Field of Classification Search ................ 455/466, 455/426.1, 414.1, 567, 566
See application file for complete search history.

(56) References Cited

U.S. PATENT DOCUMENTS

| | | | | |
|---|---|---|---|---|
| 5,574,773 | A * | 11/1996 | Grob et al. ................ | 455/466 |
| 5,796,948 | A * | 8/1998 | Cohen ........................ | 709/206 |
| 6,085,099 | A * | 7/2000 | Ritter et al. ................ | 455/466 |
| 6,088,596 | A * | 7/2000 | Kawakami et al. ......... | 455/466 |
| 6,119,014 | A * | 9/2000 | Alperovich et al. ........ | 455/466 |
| 6,192,251 | B1 * | 2/2001 | Jyogataki et al. ........... | 455/466 |
| 6,230,019 | B1 * | 5/2001 | Lee ............................. | 455/466 |
| 6,230,020 | B1 * | 5/2001 | Kantola et al. ............. | 455/466 |
| 6,240,391 | B1 * | 5/2001 | Ball et al. ................... | 704/270 |
| 6,385,461 | B1 * | 5/2002 | Raith .......................... | 455/518 |
| 6,477,243 | B1 * | 11/2002 | Choksi et al. ......... | 379/100.06 |
| 6,496,693 | B1 * | 12/2002 | Tran ........................ | 455/426.1 |
| 6,505,046 | B1 * | 1/2003 | Baker ....................... | 455/456.3 |
| 6,570,489 | B1 * | 5/2003 | Gould et al. ................ | 340/7.28 |
| 6,631,274 | B1 * | 10/2003 | Keshavachar ............... | 455/466 |
| 6,804,508 | B1 * | 10/2004 | Yamada .................... | 455/414.1 |
| 2001/0051536 | A1 * | 12/2001 | Muramatsu ................. | 455/567 |
| 2002/0013708 | A1 * | 1/2002 | Walker et al. .............. | 704/260 |
| 2002/0193124 | A1 * | 12/2002 | Hamilton et al. ........... | 455/456 |
| 2003/0211845 | A1 * | 11/2003 | Lohtia et al. ............ | 455/414.3 |
| 2004/0224706 | A1 * | 11/2004 | Lorello et al. .............. | 455/466 |

FOREIGN PATENT DOCUMENTS

| | | |
|---|---|---|
| CN | 1237060 | 5/1999 |
| EP | 1 098 503 A2 | 5/2001 |
| JP | 5-308438 | 11/1993 |
| JP | 11-215568 | 8/1999 |
| JP | 2000-13527 | 1/2000 |

(Continued)

OTHER PUBLICATIONS

Great Britain Search Report, Dec. 19, 2001.

(Continued)

*Primary Examiner*—Sonny Trinh
*Assistant Examiner*—Huy Phan
(74) *Attorney, Agent, or Firm*—Dickstein, Shapiro, Morin & Oshinsky, LLP.

(57) ABSTRACT

A letter message including transmitter's name, letter message destination telephone number 62 and letter message text 63, is worked out and stored in a memory 8 in advance by using an input unit 5 and a display unit 4 before commencing communication with the opposite side thereof. When commencing communication with the opposite side, the letter message is transmitted thereto at the time of ending the communication. The opposite side terminal stores the received letter message in a memory 8, and also displays the message on the display unit 4. If necessary, the reception of the letter message is informed as an alarm from a loudspeaker 7.

14 Claims, 6 Drawing Sheets

FOREIGN PATENT DOCUMENTS

| | | |
|---|---|---|
| JP | 2000-22840 | 1/2000 |
| JP | 2000-78654 | 3/2000 |
| JP | 2000-165951 | 6/2000 |
| WO | WO 96/09708 | 3/1996 |
| WO | WO 99/43141 | 8/1999 |

OTHER PUBLICATIONS

Japanese Office Action issued Jun. 8, 2004 (w/ English translation of relevant portions).

* cited by examiner

| NAME (61) | LETTER MESSAGE DESTINATION (62) | LETTER MESSAGE TEXT (63) |
|---|---|---|
| YAMADA TARO | 090-0123-4567 | HELLO! TODAY'S EVENTS·· |
| SUZUKI HANAKO | 090-0000-0122 | HI! THIS IS SUZUKI··· |
| KANAGAWA SABURO | 090-0123-0000 | HOW ARE YOU DOING? WELL··· |

FIG.7

FIG.8

LETTER MESSAGE COMMUNICATION METHOD AND APPARATUS

BACKGROUND OF THE INVENTION

This application claims benefit of Japanese Patent Application No. 2000-154719 filed on May 25, 2000, the contents of which are incorporated by the reference.

The present invention relates to telephone terminals and, more particularly, to letter message communication methods and apparatus in telephone terminals capable of transmitting and receiving letter messages.

Telephone terminals having a letter message communication function have various advantages over the telephone terminals for the sole voice communication, and can expand the scope of application of the communication means. As an example of the advantages obtainable with the letter message communication function, it is possible to permit telephone communication by hearing disabled persons as well and also permit reliable transmission of the will even in great noise circumstances. As another example, it is possible to accurately transmit names of places and persons to the opposite side. As a further advantage, it is possible to reliably discriminate different words of the same pronunciation. As a still further advantage, it is possible to make communication without possibility of irritating nearby persons (with noise or the like). As an yet further advantage, it is possible to transmit the will or to confirm the will of the opposite side of the communication.

In the prior art, telephone terminals having the letter message communication function and pertinent techniques are disclosed in, for instance, Japanese Patent Laid-Open No. 11-215568, Japanese Patent Laid-Open No. 2000-13527 and Japanese Patent Laid-Open No. 2000-78654. In a PHS terminal disclosed in the first mentioneperformed of the above prior art literatures, it is sought to permit letter message exchange during voice communication. In the case of currently popular letter message communication services, letter messages are usually transmitted while neither voice communication nor data communication is in force.

The above prior art techniques have some problems. Firstly, for transmitting a letter message during voice communication, it is necessary to tentatively interrupt the voice communication by making retention setting and once ending the voice communication. This is so because the transmission of a letter message during the voice communication requires the switching of the base station to a letter message reception mode. In addition, the letter message transmission requires control channel switching, and therefore it can not be performed concurrently with the voice communication. Secondly, the telephone terminal user may forget the transmission of a letter message, which is worked out in advance by himself or herself with a letter message editor. This may result when the user concentrates himself or herself in a different topic of conversation.

SUMMARY OF THE INVENTION

An object of the present invention, therefore, is to provide letter message communication method and apparatus for telephone terminals, which can solve the problems inherent in the prior art as discussed above.

The letter message communication apparatus in a telephone terminal according to the present invention, comprises a transmitter/receiver for transmitting and receiving signals to and from the opposite side of communication, an input unit for working out letter messages, a display unit for displaying letter messages, a memory for storing letter messages, a control unit for controlling the operation of the entire apparatus, and a microphone and a loudspeaker used for voice transmission and reception. Before making communication with the opposite side of communication, the telephone terminal user works out a letter message by using the input unit and the display unit, and stores the worked-out letter message in the memory. When it is detected at the end of communication that a letter message to be transmitted has not been transmitted, the control unit causes transmission of the letter message as a postscript. In a preferred embodiment of the present invention, when a letter message is received from the opposite side of communication, it is displayed in the display unit, and at the same time the reception is notified from the loudspeaker. An antenna is further connected to the transmitter/receiver, and the whole system constitutes a portable telephone terminal.

Other objects and features will be clarified from the following description with reference to attached drawings.

PREFERRED EMBODIMENTS OF THE INVENTION

Preferred embodiments of the letter message communication apparatus according to the present invention will now be described with reference to the drawings.

Figure 1:
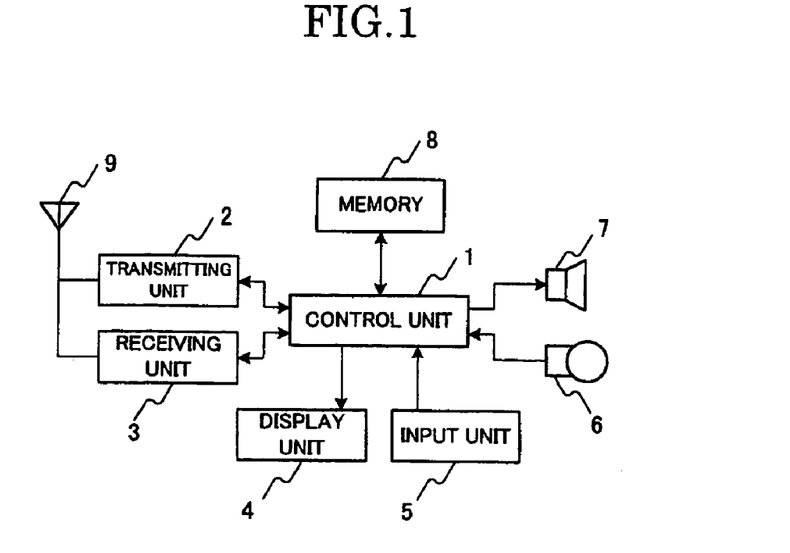
FIG. 1 is a block diagram showing the construction of a preferred embodiment of the letter message communication apparatus of a telephone terminal according to the present invention.

FIG. 1 is a block diagram showing the construction of a preferred embodiment of the letter message communication apparatus of a telephone terminal (hereinafter sometimes referred to merely as telephone terminal) according to the present invention. The telephone terminal comprises a control unit 1, a transmitting unit 2, a receiving unit 3, a display unit 4, an input unit 5, a microphone 6, a loudspeaker 7, a memory 8 and an antenna 9. The control unit 1 is connected to the transmitting, receiving and display units 2 to 4, the loudspeaker 7 and the memory 8. The input unit 5 and the microphone 6 are connected to the control unit 1. The antenna 9 is connected to the transmitting and receiving units 2 and 3.

Figure 6:
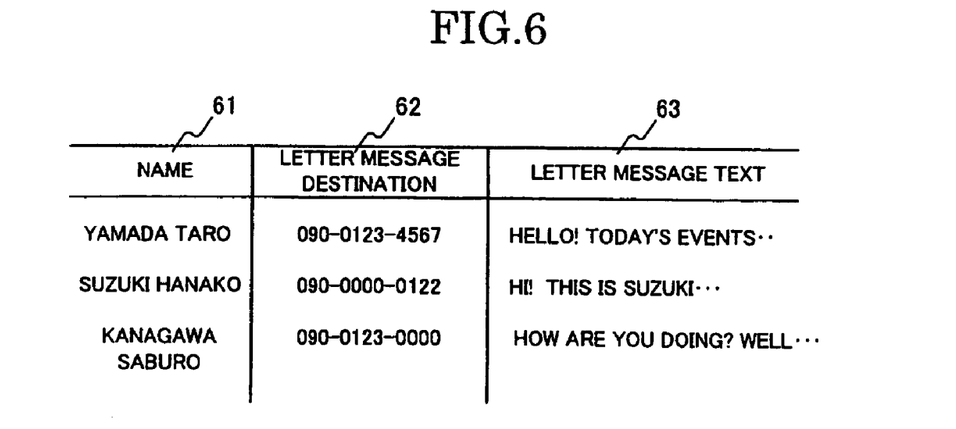
FIG. 6 shows an example of the format of storage of the registered data.

The user of this telephone terminal can make voice communication with the opposite side of communication by using the control, transmitting and receiving units 1 to 3, the microphone 6 and the loudspeaker 7. The memory 8 has a telephone diary function. In the memory 8 are stored letter message data including preliminarily registered letter message texts, which have been stored by the user for transmitting letter messages as postscripts after voice communication. FIG. 6 shows an example of the format of storage of the registered data. As shown in the Figure, the stored letter message data is constituted by "name (opposite side of communication)" 61, "letter message destination "telephone number)" 62 and "letter message text" 63.

When the telephone terminal user performs an operation of ending voice communication, before the disconnection of the telephone terminal from the network the control unit 1 makes a check with reference to the memory 8 as to whether a letter message to the opposite side of the voice communication is present. When a letter message to the opposite side of communication is present, it is transmitted as a postscript. (The letter message is transmitted directly by DTMF, data communication etc. or by utilizing a letter message function provided by such operator as short message service, e-mail, etc.) When the user receives a call from the opposite side of communication, he or she checks for any letter message to the opposite side of communication in the memory 8. This check is performed by utilizing an opposite side transmitter number notice as detected through the receiving and control units 3 and 1. When the user of the letter message notice telephone terminal transmits a call to the opposite side of communication, he or she checks for any letter message to the opposite side of communication in order to use the result of the check for a re-dial function. This check is performed by using the telephone number of the opposite side of communication as stored in the memory 8. It will be seen that when the user performs an operation of ending voice communication, a letter message can be transmitted as a postscript before the disconnection of the telephone terminal from the network.

The telephone terminal according to the present invention will now be described in detail with reference to FIG. 1. FIG. 1 shows an embodiment of the present invention applied to a portable telephone terminal. The control unit 1 controls the entire telephone terminal, which has such functions as data processing function and communication function. The transmitting unit 2 can transmit signal via the antenna 9 to the opposite side terminal of communication. The receiving unit 3 can receive signal from the opposite side terminal of communication via the antenna 9. In the memory 8, user data, telephone diary, letter messages, destinations thereof, etc. are stored. The display unit 4 may be such a display as an LED or a liquid crystal display panel. The input unit 5 is provided for inputting telephone numbers and letters (i.e., letter messages). The microphone 6 can receive user's voice. The loudspeaker 7 can generate opposite side voice output and also call arrival tone (or alarm tone). When the telephone terminal user performs an operation of ending voice communication, before the disconnection of the telephone terminal from the network a "postscript function" of additionally providing a letter message is realized.

The control unit 1 is capable of causing transmission and reception (i.e., communication) of data from and in the transmitting and receiving units 2 and 3, respectively. When the control unit 1 detects a call arrived from an opposite side with a preset transmitter number notice, it obtains the telephone number of the opposite side by a "transmitter number notice function". When the telephone terminal user transmits a call, the control unit 1 obtains the opposite side telephone number stored in the memory 8 for the purpose of a re-dial function (transmission history). The opposite side telephone number obtained by the control unit 1 is used for checking whether the opposite side of the present communication is one, which a letter message is to be transmitted to as a "postscript". This telephone number is also used as a destination, which a letter message is to be transmitted to as a "postscript" by utilizing a letter message transmission service provided by an operator.

The operation of the telephone terminal capable of making letter message communication according to the present invention, will now be described in connection with the transmission of a letter message as a "postscript" at the time of ending voice communication with reference to FIGS. 2 to 5. In the present invention, the letter message communication between two telephone terminals may be DTMF (Dual Tone Multi-Frequency) voice or data communication or the like. The transmitter number notice is essentially necessary for specifying the opposite side of communication.

Figure 2:
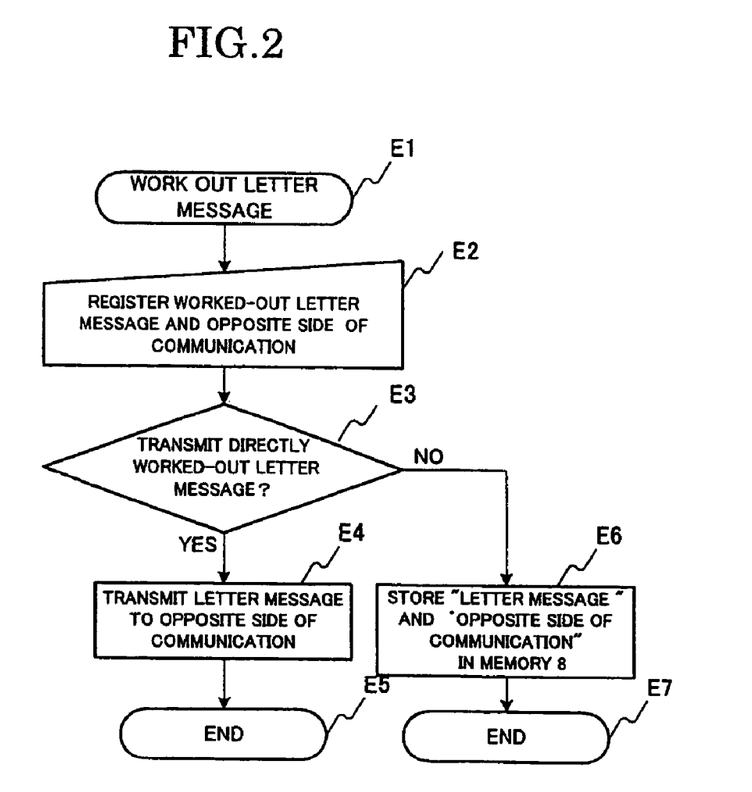
FIG. 2 is a flowchart shwoing a letter message transmitting process of a telephone terminal.

Referring to the flow chart of FIG. 2, before the commencement of the voice communication, the telephone terminal user works out a letter message to be transmitted as a postscript" (step E1). The user registers the worked-out letter message and also the opposite side of communication by using the input unit 5 (step E2). Subsequently, the control unit 1 makes a check as to whether the worked-out letter message is to be directly transmitted (step E3). In case when the letter message is transmitted immediately after it has been worked out and registered ("YES" in step E3), the control unit 1 causes transmission of the letter message by utilizing a letter message transmission service provided by a usual operator (step E4), and brings an end to the operation without use of the "postscript function" according to the present invention (step E5). In case when the letter message is not transmitted immediately after it has been worked out and registered ("NO" in step E3), the control unit 1 uses the "postscript function". Specifically, the control unit 1 stores the opposite side, which the letter message is to be transmitted to, in the memory 8 with reference to the telephone diary therein as in, for instance, FIG. 6 (step E6), and brings an end to the operation (step E7).

Figure 3:
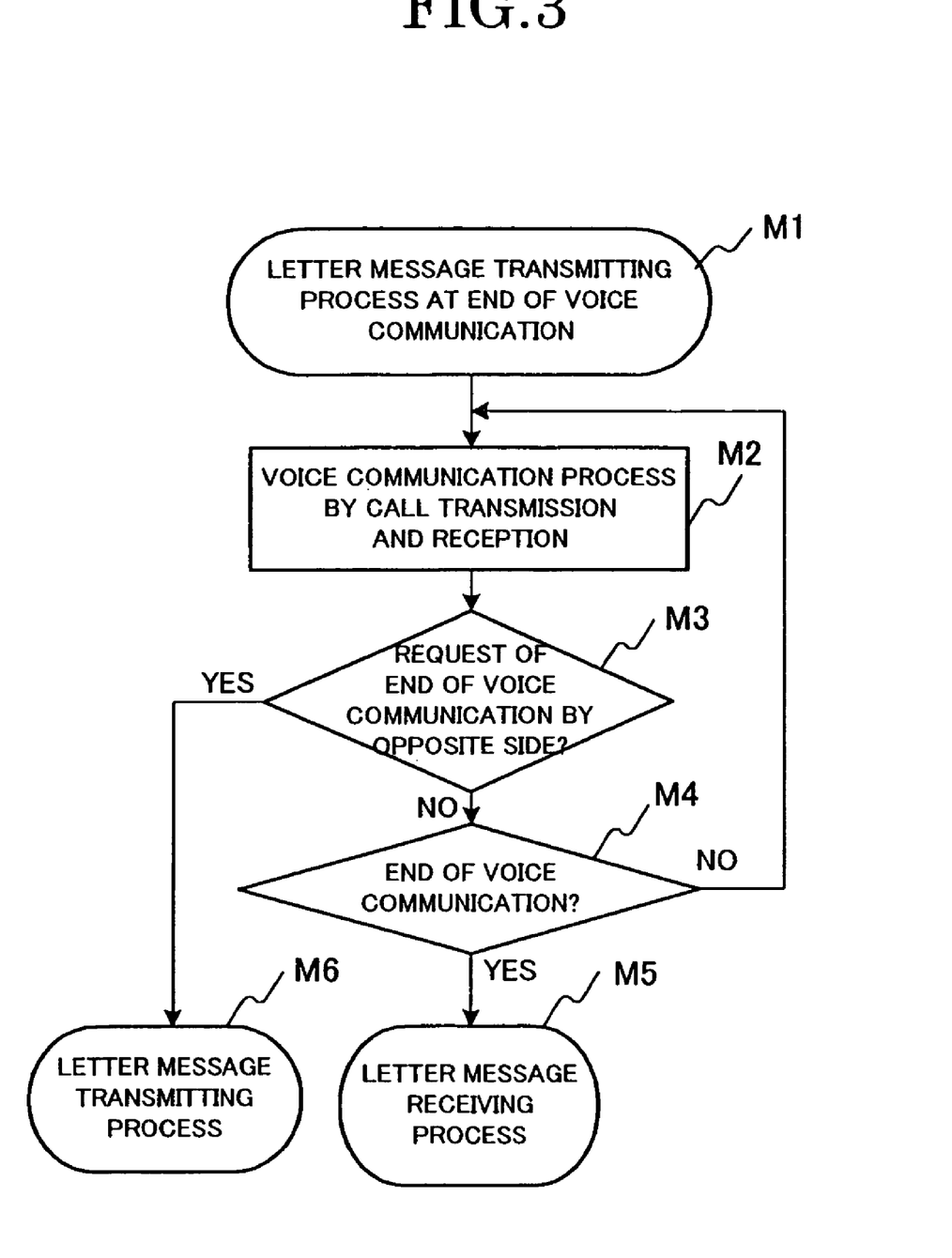
FIG. 3 is a flowchart shwoing a letter message transmitting process of a telephone terminal at the time of ending voice communication.

Now, a letter message transmitting process (step M1) or operation (routine) at the time of ending voice communication will be described with reference to the flow chart of FIG. 3. After registering the letter message and the opposite side of communication, the telephone terminal user makes voice communication, i.e., voice communication process by call transmission and reception, with the opposite side of communication (step M2). The user then checks whether the ending of the voice communication is requested by the opposite side (step M3). When the ending of the voice communication is requested by the opposite side ("YES" in step M3), the control unit 1 executes the letter message transmitting process (step M6, step T1 in FIG. 4). The letter message transmitting process will be described later with reference to step T1 in FIG. 4. When the ending of the voice communication is not requested by the opposite side ("NO" in step M3), the control unit 1 checks whether the voice communication is to be ended (step M4). When the voice communication is to be ended ("YES" in step M4), the control unit 1 executes a letter message receiving process (step M5). The letter message receiving process will be described later with reference to step R1 in FIG. 5. When the voice communication is not to be ended ("NO" in step M4), the routine goes back to the step M2.

Figure 4:
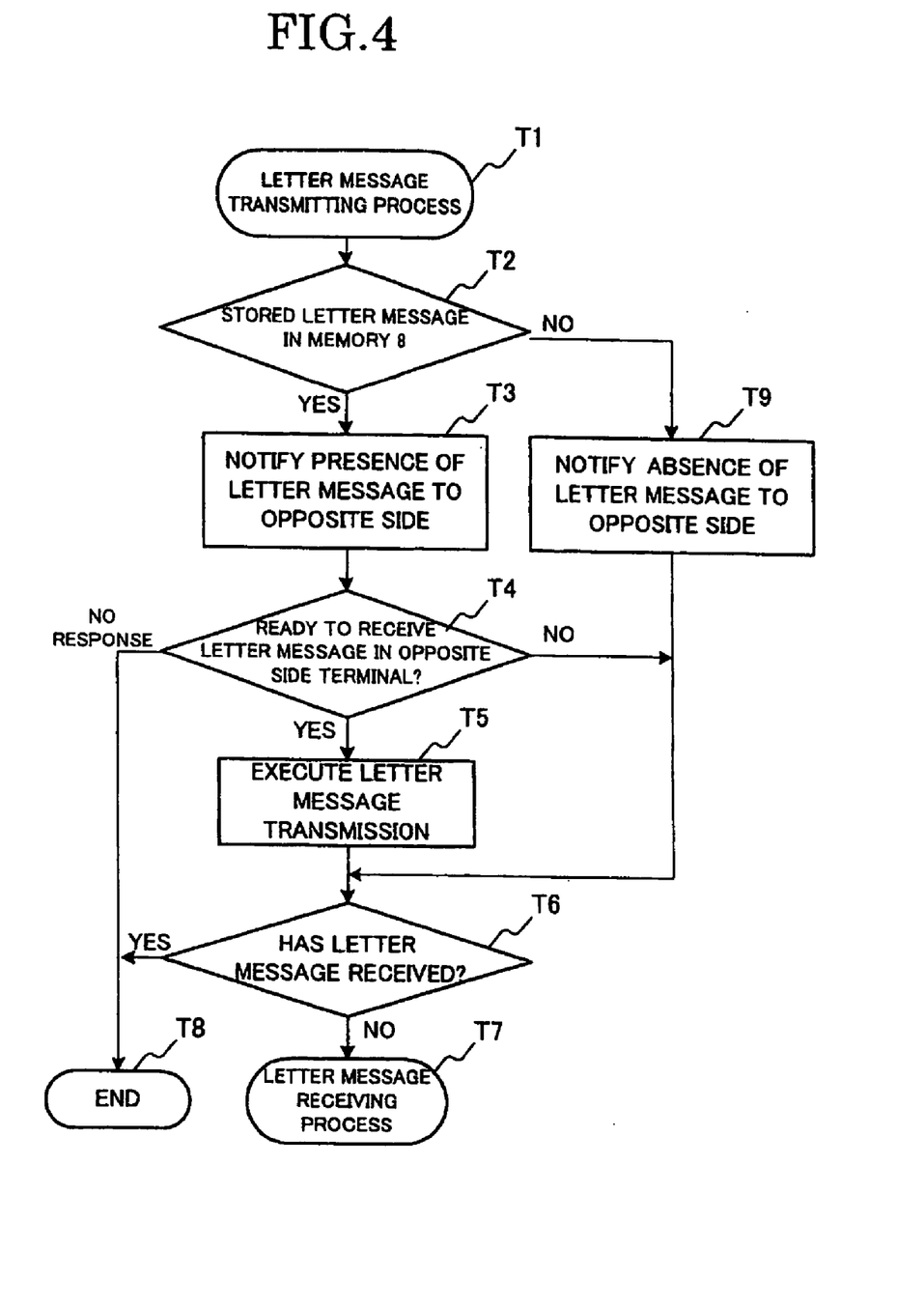
FIG. 4 is a detailed flowchart shwoing a letter message transmitting process in FIG. 3.

Referring now to FIG. 4, the letter message transmitting process (step T1) will be described. When a letter message to be transmitted is stored in the memory 8 ("YES" in step T2), the control unit 1 notifies the presence of the letter message to the opposite side of communication, which has requested the ending of voice communication (step T3). The control unit 1 then checks whether the opposite side terminal has notified, in response to this notice, to be ready to receive the letter message (step T4). When the opposite side terminal has provided no response concerning whether it is ready to receive the letter message (no response in step T4), it is not supporting the "postscript function" according to the present invention. Thus, the control unit 1 brings an end to the letter message transmitting process, thus ending the voice communication (step T8). When the opposite side terminal has notified that it is not ready to receive the letter message ("NO" in step T4), there may be some reason why this is so. Accordingly, the control unit 1 performs not execute the letter message transmitting process with respect to the opposite side of communication, but it checks whether its own terminal has received a letter message (step T6). When a letter message has been received ("YES" in step T6), the control unit 1 brings an end to the letter message transmitting process, thus ending the voice communication (step T8). When no letter message has been received yet ("NO" in step T6), the control unit 1 executes the letter message receiving process for receiving a "postscript" letter message from the opposite side of communication (step T7). When the opposite side terminal has notified, after the notification of the letter message transmission to it (step T7), that it is ready to receive the letter message ("YES" in step T4), the control unit 1 executes the letter message transmitting process (step T5). When this process has been ended, the control unit 1 checks whether its own terminal has already made letter message reception (step T6). When the own terminal has already made the letter message reception, the control unit 1 brings an end to the letter message transmitting process, thus ending the voice communication (step T8). When the own terminal has not made letter message reception, the control unit 1 executes the letter message receiving process to receive a "postscript" letter message from the opposite side of communication (step T7). When no letter message to be transmitted is stored in the memory 8 ("NO" in step T2), the control unit 1 notifies to the opposite side terminal, which has requested the ending of the voice communication, that no letter message to be transmitted is present (step T9). Subsequently, the control unit 1 again performs not execute the letter message transmitting process to the opposite side of communication, but checks whether its own terminal has received a letter message (step T6). When the letter message has been received, the control unit 1 brings an end to the letter message receiving process and the voice communication (step T8). When no letter message has been received, the control unit 1 executes the letter message receiving process to receive a "postscript" letter message from the opposite side of communication (step T7). The letter message receiving process will be described hereinbelow with reference to step R1 in FIG. 5.

Figure 5:
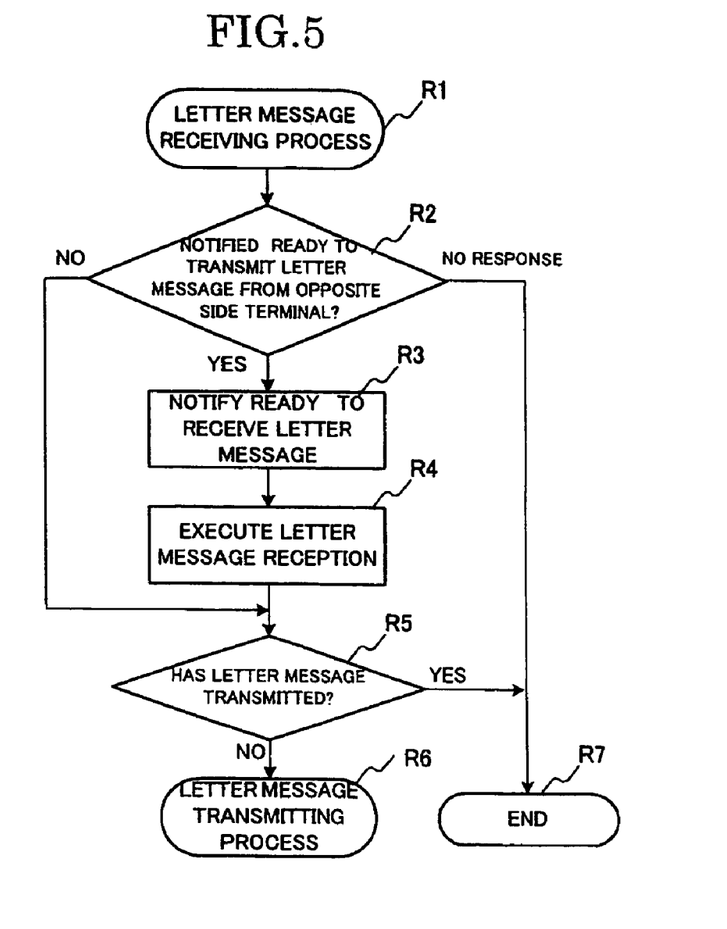
FIG. 5 is a detailed flowchart shwoing a letter message receiving process in FIG. 4.

Referring to FIG. 5, the letter message receiving process (step R1) will now be described. The control unit 1 checks for any letter message received from the opposite side of communication (step R2). When the opposite side of communication has provided no response (no response in step R2), it is not supporting the "postscript function" according to the present invention. Thus, the control unit 1 brings an end to the letter message receiving function, thus ending the voice communication (step R7). When the opposite side of communication notifies that no letter message is present, ("NO" in step R2), the control unit 1 performs not execute the letter message receiving process, but it checks whether its own terminal has already made letter message transmission (step R5). When the letter message transmission has been made, the control unit 1 brings an end to the letter message receiving function, thus ending the voice communication (step R7). When no letter message has been transmitted yet, the control unit 1 executes the letter message transmitting process to transmit a "postscript" letter message to the opposite side of communication (step R6). When the opposite side of communication has notified that a letter message to be transmitted is present, ("YES" in step R2), the control unit 1 notifies that it is ready to receive the letter message (step R3), and then executes the letter message receiving process to receive the opposite side "postscript" letter message (step R4). After the letter message receiving process, the control unit 1 checks whether its own terminal has already made letter message transmission (step R5). When the letter message transmission has already been made, the control unit 1 brings an end to the letter message receiving process, thus ending the voice communication (step R7). When no letter message has been transmitted yet, the control unit 1 executes the letter message transmitting process to transmit a "postscript" letter message to the opposite side of communication (step R6).

Figure 7:
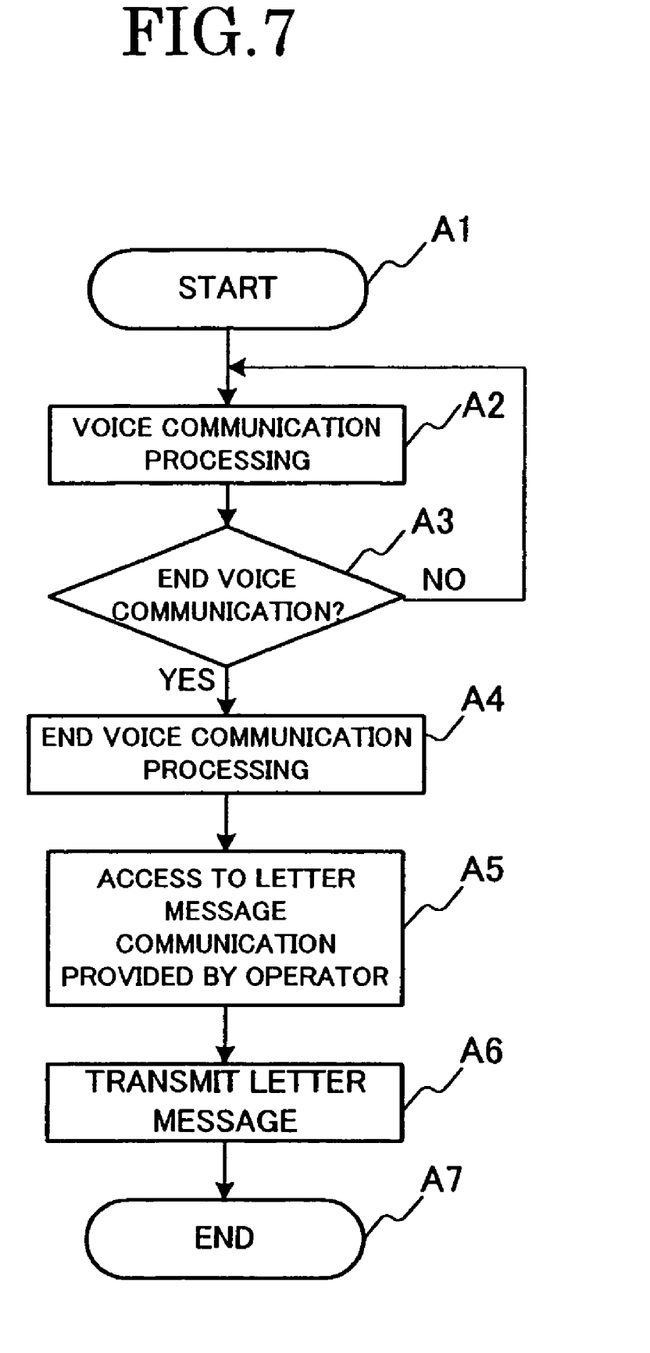
FIG. 7 is a flow chart for describing the operation of another embodiment of the present invention.

The letter message communication method in the telephone terminal according to another embodiment of the present invention will now be described with reference to FIGS. 7 and 8. FIG. 7 is a flow chart for describing the operation of a second embodiment of the present invention. In the above embodiment, after a user's operation of ending voice communication, transmission and reception of "postscript" letter messages are performed with respect to the opposite side of communication before the disconnection of the telephone terminal from the network. In the second embodiment, right after perfect ending of voice communication, the control unit 1 makes "postscript" transmission by utilizing a letter message transmission service provided by a communication operator.

Like the previous preferred embodiment, in this embodiment "postscript" letter messages and opposite side terminals for transmitting the "postscripts" thereto, as shown in FIG. 6, are registered in the memory 8 before the commencement of voice communication. In this embodiment, operating methods concerning letter message communication services provided by communication operators are additionally registered in the memory 8. The "postscript" transmission is realized as the control unit 1 causes transmission of the letter message to the opposite side of voice communication in a pertinent registered operating method. The opposite side of voice communication can be discriminated from the transmitter number notice (when the opposite side has transmitted a call) and also from the re-dial function (i.e., transmission history).

This embodiment will now be described in detail with reference to the flow chart of FIG. 7. When the "postscript" transmission process sequence is commenced (step A1), a voice communication process is executed (step A2). Then, the control unit 1 checks whether the voice communication has been ended (step A3). When the voice communication has been ended ("YES" in step A3), the control unit 1 brings an end to the voice communication process (step A4). Then, the control unit 1 accesses a service center in a method of connection to a letter message communication service provided by a communication operator (step A5). After this accessing, the control unit 1 causes transmission of a letter message (step A6), and then brings an end to the "postscript" transmission process (step A7). In the above procedure, the postscript function can be provided by the letter message communication provided by the communication operator after the end of communication. When the voice communication has not been ended ("NO" in step A3), the routine goes back to the step A2.

Now, a third embodiment of the present invention will be described with reference to the flow chart of FIG. 8. This third embodiment concerns a telephone terminal, which can set a time from the reception till the display of a letter message. More specifically, the embodiment features additional provision of time count data, which is provided in a letter message for setting the time from the reception of the message till the display thereof by using the control and display units 1 and 4.

Figure 8:
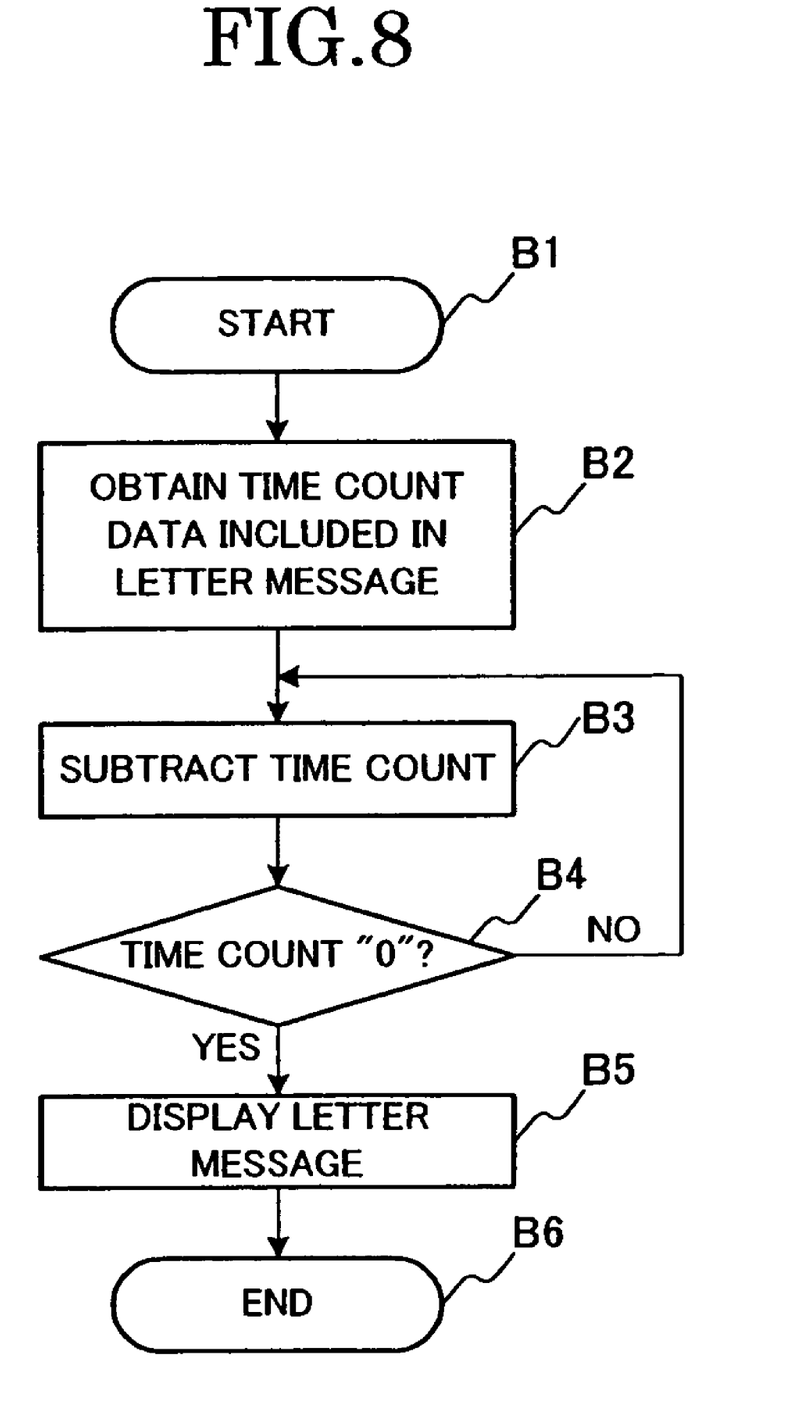
FIG. 8 is a flow chart for describing the operation of other embodiment of the present invention.

Referring to the flow chart of FIG. 8, when the process sequence is started (step B1), the control unit 1 obtains time count data contained in the letter message received from the opposite side of communication (step B2). The control unit 1 then executes a subtraction time count processing matched to a timer provided therein (step B3). The control unit 1 then checks whether a time count variable is zero (step B4). When the time count variable is not zero ("NO" in step B4), the control unit 1 goes back to the step B3 to continually execute the above subtraction processing. When the time count variable is reduced to zero by the subtraction processing ("YES" in step B4), the control unit 1 causes display of the letter message received from the opposite side of communication by using the display 1 (step B5). At this time, in addition to the message display on the display unit 4 the message display state is preferably informed as alarm to the user from the loudspeaker 7. The above processing permits obtaining a telephone terminal, which can set a time from the reception of a letter message transmitted from the opposite side of communication till the display of the message.

As has been described in the foregoing, the letter message transmitting method and apparatus in telephone terminal according to the present invention permit the following various pronounced practical effects to be obtained. Firstly, with a letter message inputted in advance as a postscript before commencement of communication, the contents of a speech which is intended to be conveyed to the opposite side of communication, can be reliably given without possibility of forgetting to the opposite side terminal. This is so because a postscript which can be worked out in advance before commencement of communication, can be transmitted as letter message to the opposite side terminal after the end of communication.

Secondly, it is possible to utilize a letter message as a signature with respect to voice communication (like an electronic mail signature function for a name, contact place, etc.), so that it is possible to reliably transmit own contact place to the opposite side terminal of communication. This is so because the letter message transmitting function can reduce the possibility of misunderstanding by the opposite side of communication, that may be the case in the voice data transmission. Utilization of the letter message as signature or for confirmation purpose, permits coping with a case when the opposite side of communication fails to hear a contact place or a case of failure of making at hand a note of a contact place (particularly when walking outdoors or driving a car).

Thirdly, the letter message can be utilized for advertisement purposes. This is so because of the user of the telephone terminal according to the present invention as a telephone set provided in a project, can add PR or CM to the postscript.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A letter message communication method in a telephone terminal having a letter message producing function and capable of transmitting the letter message to an opposite side of communication, wherein:
   a check is made at the time of ending voice communication as to whether a letter message worked out in advance has been transmitted, and when the letter message has not yet been transmitted, transmitting the letter message after ending the voice communication.

2. The letter message communication method in a telephone terminal according to claim 1, wherein the letter message includes the transmitter's name, the letter message destination and a letter message text.

3. The letter message communication method of claim 1, wherein the letter message is transmitted before disconnection of the telephone terminal.

4. The letter message communication method according to claim 1, further comprising:
   storing a telephone number of the opposite side of communication.

5. A letter message communication method in a telephone terminal having a letter message producing function and capable of transmitting the letter message to an opposite side of communication, wherein:
   a check is made at the time of ending voice communication as to whether a letter message worked out in advance has been transmitted, and when the letter message has not yet been transmitted, transmitting the letter message after ending the voice communication by utilizing a letter message communication service provided by a communication operator.

6. The letter message communication method in a telephone terminal according to claim 5, wherein the letter message includes the transmitter's name, the letter message destination and a letter message text.

7. A letter message communication method in a telephone terminal having a letter message producing function and capable of transmitting the letter message to an opposite side of communication, wherein:
   a check is made at the time of ending voice communication as to whether a letter message worked out in advance has been transmitted, and when the letter message has not yet been transmitted, transmitting the letter message after ending the voice communication and time count data is added to the letter message.

8. The letter message communication method in a telephone terminal according to claim 7, wherein the letter message includes the transmitter's name, the letter message destination and a letter message text.

9. A letter message communication apparatus in a telephone terminal comprising:
   a transmitter/receiver for transmitting and receiving calls and letter message signals to and from an opposite side of communication, an input unit for working out letter messages,
   a display unit for displaying letter messages,
   a memory for storing the letter messages,
   a control unit for controlling operation of the apparatus, and
   a microphone and a loudspeaker for transmitting and receiving calls,
   wherein the control unit is adapted to check at the time of ending voice communication as to whether a letter message worked out in advance has been transmitted and to cause transmission of the letter message stored in the memory when the letter message has not yet been transmitted.

10. The letter message communication apparatus according to claims 9, which further comprises an antenna connected to the transmitter/receiver and constitutes a portable telephone terminal.

11. The letter message communication apparatus of claim 9, wherein the control unit is further adapted to transmit the letter message before disconnection of the telephone terminal.

12. The letter message communication apparatus of claim 9, wherein the memory is further adapted to store the telephone number of the opposite side of communication.

13. A letter message communication apparatus in a telephone terminal comprising:

a transmitter/receiver for transmitting and receiving signals to and from an opposite side of communication, an input unit for working out letter messages, a display unit for displaying letter messages, a memory for storing the letter messages, a control unit for controlling the operation of the entire apparatus, and a microphone and a loudspeaker for transmitting and receiving calls, wherein the control unit is adapted to check at the time of ending voice communication as to whether a letter message worked out in advance has been transmitted and to cause transmission of the letter message when the letter message has not yet been transmitted, and to display a letter message, upon reception thereof from the opposite side of communication, on the display unit, and indicating receipt of the letter message on the loudspeaker.

14. The letter message communication apparatus according to claims 13, which further comprises an antenna connected to the transmitter/receiver and constitutes a portable telephone terminal.

* * * * *